Figure 1:
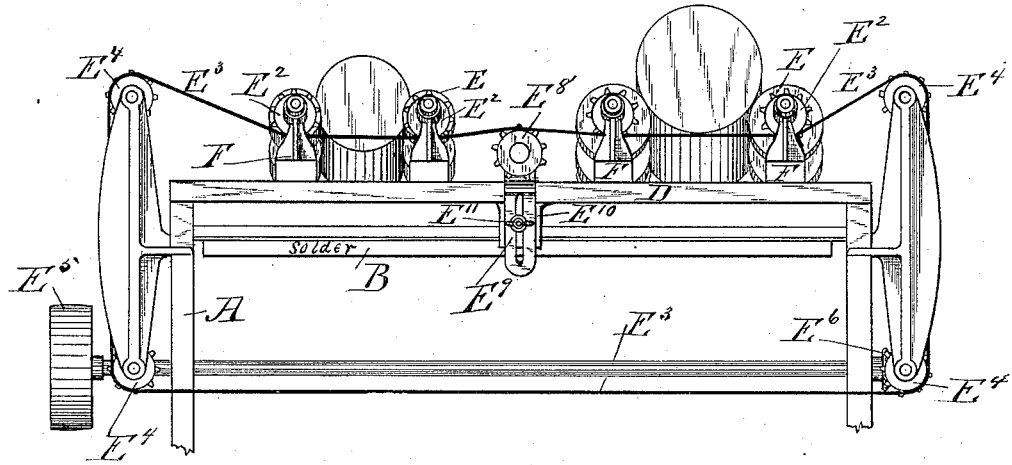

(No Model.) 2 Sheets—Sheet 1.

E. NORTON & J. G. HODGSON.
SOLDERING MACHINE.

No. 307,726. Patented Nov. 4, 1884.

Witnesses:
Lew. E. Curtis.
Taylor E. Brown.

Inventors.
Edwin Norton, John G. Hodgson,
By Munday, Evarts & Adcock,
their Attorneys.

(No Model.) 2 Sheets—Sheet 2.
E. NORTON & J. G. HODGSON.
SOLDERING MACHINE.
No. 307,726. Patented Nov. 4, 1884.
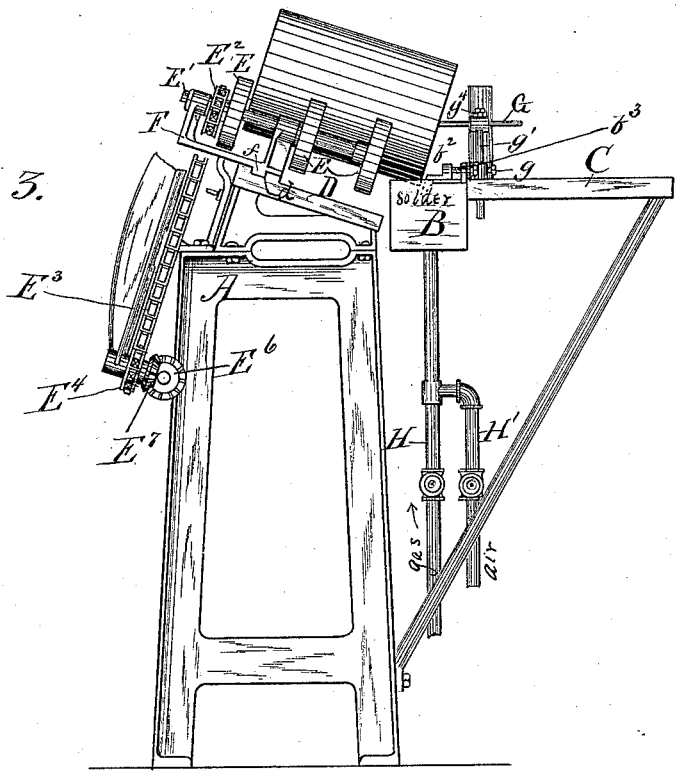
Fig. 3.
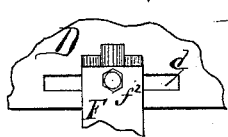
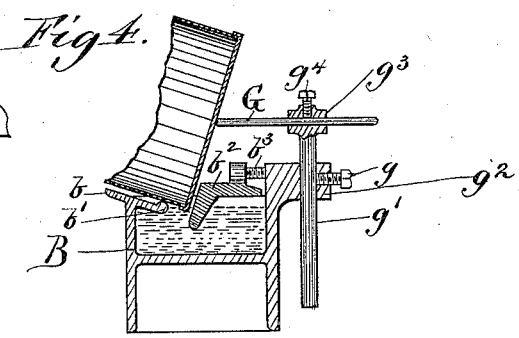
Fig. 5.  Fig. 4.
Witnesses:
Lew. E. Curtis.
Taylor E. Brown
Inventors
Edwin Norton
John G. Hodgson
By Munday, Evarts & Adcock,
their Attorneys

UNITED STATES PATENT OFFICE.

EDWIN NORTON AND JOHN G. HODGSON, OF CHICAGO, ILL., ASSIGNORS TO SAID EDWIN NORTON AND OLIVER W. NORTON, OF SAME PLACE.

SOLDERING-MACHINE.

SPECIFICATION forming part of Letters Patent No. 307,726, dated November 4, 1884.

Application filed June 5, 1884. (No model.)

*To all whom it may concern:*

Be it known that we, EDWIN NORTON and JOHN G. HODGSON, citizens of the United States, residing in Chicago, in the county of Cook and State of Illinois, have invented a new and useful Improvement in Soldering-Machines, of which the following is a specification.

This invention relates to machines for soldering the ends or heads upon sheet-metal cans, and more particularly to that class of such machines wherein the can is revolved or turned in a bath of molten solder. Heretofore in these machines the cans have usually been placed in a revolving holder or chuck, by means of which they have been revolved in the solder bath. Machines of this kind are illustrated, for example, in the patent to J. G. Borden, No. 95,418, dated October 5, 1869; but a great deal of time is necessarily lost or consumed in putting the cans in and taking them out of such revolving holders, and difficulty is also experienced in adjusting such holders to operate upon cans of different lengths or sizes. Other machines of this kind have also heretofore been built wherein the can is placed and rests upon friction-rollers arranged above the solder bath and the can revolved thereon by means of a movable driving-roll above the can, which is brought into frictional contact with each can in turn as it is placed in the bath. Such machines are illustrated in the patent to T. H. Niles, No. 54,195, dated April 24, 1866; but considerable time is also required in moving this driving-roll from and into contact with each can to be soldered, and the can is also liable to slip or fail to turn if the operator does not happen at all times to hold the driving-roll in contact with the can with the proper degree of pressure.

The object of the present invention is to provide a simple and effective machine for soldering the ends of cans by revolving them in a bath of molten solder, and by means of which the cans may be placed in and taken out of the machine with great facility and dispatch, and wherein, also, the machine may be quickly and easily adjusted to suit cans of any size or length; and to this end our invention consists, primarily, in revolving the can in the solder bath by means of a pair of revolving rolls or pulleys upon and between which the can rests, and which thus communicate a revolving motion to the can. These rolls are of course driven in the same direction. Any suitable means may be employed to operate them—as, for example, a continuously-moving chain or belt engaging with sprocket-wheels or pulleys on the ends of the rollers. These rolls or the bearings in which they are mounted are made adjustable to and from each other, so that by simply placing them nearer together or farther apart they will accommodate cans of different diameters. In order to diminish as much as possible the friction of the can in revolving, we provide an adjustable pivotal bearing, against which the end of the can rests and upon which it revolves as upon a pivot. By this means the cans may be soldered with very great facility, as all that the operator is required to do is simply to lay or place the can upon the revolving rolls, leave it there until the joint is soldered by revolution in the bath and then remove it and replace it by another can. This of course may be very easily done by a boy, and there is no necessity to stop the machine or the rolls in order to place the can in or take it out. As the parallel rolls all revolve in the same direction, place or means for soldering an additional can at the same time may be made by simply adding another roll. The machine may therefore be made to solder a dozen or more cans at a time with very little additional cost in its construction.

Our invention also consists in the novel devices and novel combinations of devices herein shown, described, and claimed.

Figure 2:
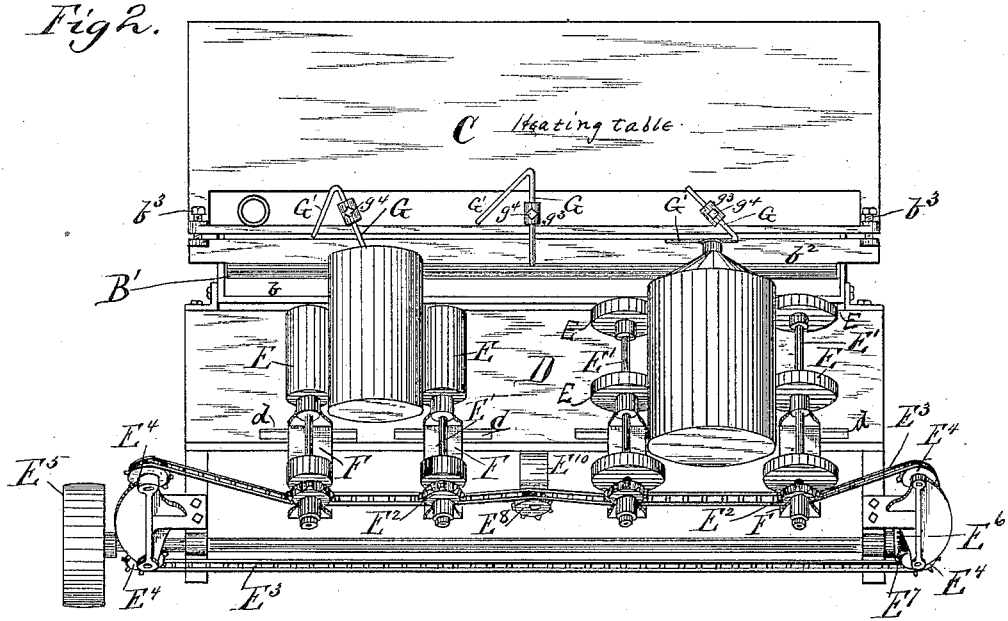

In the accompanying drawings, which form a part of this specification, and in which similar letters of reference indicate like parts, Figure 1 is a side elevation of a machine embodying our invention. Fig. 2 is a plan view of the same. Fig. 3 is an end elevation. Fig. 4 is a vertical cross-section, and Fig. 5 is a detail plan view, of one of the adjustable inclined can revolving and supporting rolls.

In said drawings, A represents the frame of the machine, which is or may be of any suitable construction; B, the tank or bath of molten solder, and C a heating plate or table upon which the cans to be soldered may be placed preliminary thereto. The top plate or part, D, of the frame should preferably be inclined at about the angle it is desired to incline the cans in order to present their edge or corner properly to the bath of molten solder. This plate or rail D is provided with one or more longitudinal slots, d, which also serve as a guide-groove.

E E are the inclined can revolving and supporting rolls. The shafts E' of these rolls are journaled in adjustable brackets or bearing-blocks F, which are provided with a tongue or projection, f, that fits in the guide d, for the purpose of securing the brackets and their rolls parallel to each other. The brackets or slides F are secured to the plate D by bolt f', which passes through the slots d in said plate, and by means of which the rolls E E may be adjusted to the desired distance apart to present the end or corner of the can properly to the bath B. The shafts E' of these rolls are each provided with a sprocket-wheel, $E^2$, by means of which said rolls are revolved by the chain $E^3$, which passes around the pulleys $E^4$ at the corners of the machine.

$E^5$ is the driving-pulley by which this sprocket-chain is actuated through the spur-gears $E^6$ $E^7$.

$E^8$ is an adjustable pulley for regulating the tension of the chain mounted on the movable slide $E^9$, which is adjustably secured to the arm $E^{10}$ by means of the set-screw $E^{11}$.

The solder bath B is provided at its top with an inclined plate, b, having a rounded projection, b', against which the side or body of the can rests. This rounded projection or rail b' serves as a guide for the can. The rolls E E, upon and between which the can rests, should, however, be so adjusted that the can resting between the rolls will just touch the rounded bead or rail b' without bearing much weight thereon. The top of the tank B is provided with an adjustable rail or guide, $b^2$, which forms the back wall of the slot B', in which the end or corner of the can projects, and through which it comes in contact with the molten solder in the tank. This rail or guide $b^2$ may be adjusted to or from the can, so as to increase or diminish the width of the slot in the tank by means of the adjusting-screws $b^3$. The end of the can is not permitted to bear against or touch this guide-rail $b^2$, but for the purpose of diminishing friction is supported against the end of a pivot or pin, G, which is made adjustable both vertically and to or from the end of the can, so that the pivot may be made to rest against the center of the can-head or near its center. The adjustment of this pin vertically is effected by means of a set-screw, g, by which the vertical shank g' is fixed or secured to the bracket or projection $g^2$. The shank g' is provided with a sleeve, $g^3$, on its upper end, through which the pin or pivot G passes, and may be adjusted to or from the can by means of the set-screw $g^4$. By turning the shank g' so that the pin G stands at an angle to the can, the bearing end or point of the pivot G may be adjusted laterally to correspond to the lateral adjustment of the rolls E E, so that it will be seen that by turning the shank g' and adjusting it up and down, and by adjusting the pivot G in the sleeve $g^3$, the end of said pivot may be adjusted to near the center of any can, whatever may be its diameter or the relative adjustment of its supporting-rolls E E.

In soldering cans which have conical ends terminating in a nozzle—like kerosene-cans, for example—and which, therefore, have no flat heads for the end of the pivot G to bear against, we provide the pivot G with a bent arm, G', inclined preferably at an angle of about forty-five degrees to the pin G, which bent arm may be set at right angles to the axis of the can, as shown in Fig. 2, and thus form a pivotal bearing for such cans. In this case, of course, the conical point or nozzle of the can is really the pivot, rather than the arm G' extending at right angles to the axis of the can. If preferred, also, the pivot-pin G may be set so that the angle formed by the junction of the arm G' will project partially into the central hole or nozzle of such conical-headed cans.

The rolls E E should be made of larger diameter than the sprocket-wheels for long cans, so that the can may project over the sprocket-wheels without touching them. In the drawings we have shown the rolls E E of two different sizes.

It will be observed that three cans may be soldered at a time on a machine having four rolls, as a can may be placed between each two rolls. By simply increasing the number of rolls the machine will be enabled to solder an additional can for each additional roll. The rolls E may of course consist of continuous cylinders, or one or more narrow pulleys, as shown in the drawings. The solder in the tank B is preferably kept in a molten condition by gas-flame. H represents a gas-pipe, and H' an air-pipe, for supplying such flame.

Though it is the preferable method of practicing our invention to make both or all the rolls E E, upon which the cans rest, can-revolving as well as can-supporting rolls—that is to say, to have them all driven—still some of the advantages of our invention may be secured if only each alternate roll E is driven by the sprocket-chain, and the other rolls E made to act simply as friction-rolls to support the can. Our invention is therefore not confined to rolls all of which are driven by the sprocket-chain or equivalent means.

We claim—

1. In a can-soldering machine, the combination of a solder bath or tank with inclined can-supporting and can-revolving rolls and mechanisms for driving said rolls, and thus rotating the can, substantially as specified.

2. The combination, with a solder bath, of inclined can-supporting and can-revolving rolls and a pivot or pin for the end of the can to rest and turn upon, substantially as specified.

3. The combination, with a solder bath, of a series of can-supporting and can-revolving rolls, all driven in the same direction, and a sprocket chain and wheels for driving said rolls, substantially as specified.

4. The combination of the solder bath with two or more can-supporting and can-revolving inclined rolls adjustable to and from each other, to accommodate cans of different diameters, substantially as specified.

5. The combination of the solder bath with two or more adjustable inclined can-supporting and can-revolving rolls and one or more adjustable pivots for the end of the can to rest and turn against, substantially as specified.

6. The combination of solder bath B, slotted rail or plate D, adjustable slides or brackets F, rolls E, journaled upon said adjustable brackets, sprocket-wheels $E^2$, and sprocket-chains $E^3$, and adjustable tension-pulley $E^8$, substantially as specified.

7. The combination, with a soldering-machine wherein the can is revolved in an inclined position in a bath of molten solder, of an adjustable pivot, G, for the end of the can to rest and revolve against, substantially as specified.

8. The combination, with a soldering-machine wherein the can is revolved in an inclined position in a bath of molten solder, of an adjustable pivot, G, having a bent arm, G', to form a pivotal bearing for conical-headed cans, substantially as specified.

9. In a soldering-machine wherein the can is revolved in a bath of molten solder, a pivot or pin for the end of the can to rest and bear against, substantially as specified.

EDWIN NORTON.
JOHN G. HODGSON.

Witnesses:
H. M. MUNDAY,
EDMUND ADCOCK.